US012404710B2

(12) United States Patent
Margonari et al.

(10) Patent No.: US 12,404,710 B2
(45) Date of Patent: Sep. 2, 2025

(54) HINGE FOR A DEVICE, IN PARTICULAR FOR A HOUSEHOLD APPLIANCE OR A PIECE OF FURNITURE, AS WELL AS DEVICE, IN PARTICULAR HOUSEHOLD APPLIANCE OR PIECE OF FURNITURE

(71) Applicant: GRONBACH G.m.b.H, Laag/Neumarkt (IT)

(72) Inventors: Massimiliano Margonari, Trento (IT); Gerold Meurer, Bardolino (IT)

(73) Assignee: GRONBACH G.m.b.H, Laag/Neumarkt (IT)

( * ) Notice: Subject to any disclaimer, the term of this patent is extended or adjusted under 35 U.S.C. 154(b) by 1 day.

(21) Appl. No.: 18/517,933

(22) Filed: Nov. 22, 2023

(65) Prior Publication Data

US 2024/0175306 A1 May 30, 2024

(30) Foreign Application Priority Data

Nov. 25, 2022 (EP) ..................................... 22209657

(51) Int. Cl.
*E05F 1/12* (2006.01)
*E05D 3/06* (2006.01)
*A47L 15/42* (2006.01)

(52) U.S. Cl.
CPC .............. *E05F 1/1261* (2013.01); *E05D 3/06* (2013.01); *A47L 15/4261* (2013.01); *E05F 1/1276* (2013.01); *E05Y 2900/30* (2013.01)

(58) Field of Classification Search
CPC ..... E05F 1/1261; E05F 1/1253; E05F 1/1269; E05F 1/1276; E05F 1/1246; E05F 1/12; E05D 3/06; A47L 15/4261; E05Y 2900/30
See application file for complete search history.

(56) References Cited

U.S. PATENT DOCUMENTS 3,453,779 A * 7/1969 Reifenberg ......... A47L 15/4261 49/386
10,145,157 B2 * 12/2018 White ................... E05F 1/1261
10,244,920 B2 * 4/2019 Vanini ........................ E05D 3/14
11,268,313 B2 * 3/2022 Terenzi ...................... E05F 3/10
11,339,600 B2 * 5/2022 Himmelein ............. E05D 3/122
11,603,687 B2 * 3/2023 Giovannetti .............. E05F 5/02
11,697,955 B2 * 7/2023 Vanini ................... E05F 1/1261 16/277

(Continued)

FOREIGN PATENT DOCUMENTS

EP 3061383 * 8/2016
EP 4306752 A1 * 1/2024 ............ E05D 11/00

*Primary Examiner* — Jeffrey O'Brien
(74) *Attorney, Agent, or Firm* — Fitch, Even, Tabin & Flannery LLP

(57) ABSTRACT

The invention relates to a hinge for a device, with a base element, with a hinge arm, which is connected to the base element pivotably around a first pivot axis in relation to the base element, with a transfer element, which is retained on the base element rotatably around a rotational axis in relation to the base element, with a spring, and with an actuation element coupled to the spring-, which actuation element is coupled to the transfer element in articulated manner and is displaceable in guided manner along a guide of the base element, such that by displacing the actuation element effected along the guide, the spring can be loaded and unloaded.

15 Claims, 5 Drawing Sheets

(56) References Cited

U.S. PATENT DOCUMENTS

Figure 1:
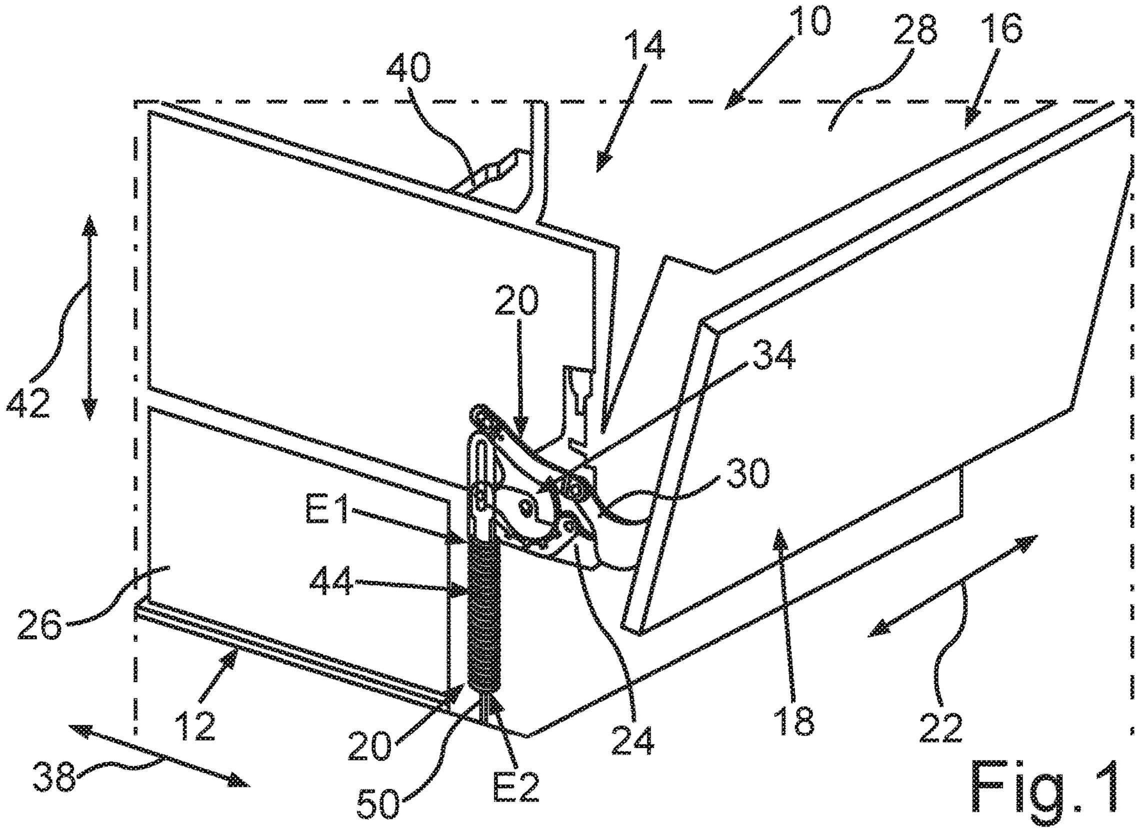

| | | | | |
|---|---|---|---|---|
| 2007/0209654 | A1* | 9/2007 | Wang | E05F 1/1276<br>126/194 |
| 2015/0152675 | A1* | 6/2015 | Vanini | A47B 96/00<br>16/288 |
| 2021/0277696 | A1* | 9/2021 | Gherardi | E05F 1/1269 |

* cited by examiner

HINGE FOR A DEVICE, IN PARTICULAR FOR A HOUSEHOLD APPLIANCE OR A PIECE OF FURNITURE, AS WELL AS DEVICE, IN PARTICULAR HOUSEHOLD APPLIANCE OR PIECE OF FURNITURE

CROSS-REFERENCE TO RELATED APPLICATIONS

This application claims priority to European Application No. 22209657.0, filed Nov. 25, 2022, which is hereby incorporated by reference herein in its entirety.

The invention relates to a hinge for a device, in particular for a household appliance or a piece of furniture. Furthermore, the invention relates to a device, in particular to a household appliance or a device, with at least one such hinge.

Devices such as for example household appliances and pieces of furniture with respective hinges are already sufficiently known from the general prior art. Therein, the respective device comprises a respective device body, which for example comprises a receiving space also referred to as receiving area. For example, the receiving space is a baking cavity, wherein the device is then for example formed as a baking oven. Therein, the receiving space is for example a cooking space, in which food can be cooked. In particular if the device is for example formed as a dishwasher, the receiving space can be a treatment chamber for washing or purging dishes. Furthermore, the device comprises a door also referred to as flap, which is connected to the respective device body in articulated manner via at least one hinge, usually via at least or exactly two hinges, and thereby is retained on the respective device body pivotably in relation to the respective device body.

It is the object of the present invention to provide a hinge for a device such as for example a household appliance or a piece of furniture, as well as a device with at least one such hinge, such that a particularly advantageous actuation of a door of the device can be realized.

According to the invention, this object is solved by a hinge with the features of claim 1 as well as by a device with the features of claim 15. Advantageous configurations with convenient developments of the invention are specified in the remaining claims.

A first aspect of the invention relates to a hinge for a device. This means that the device comprises the hinge in its completely produced state. In particular, the device comprises a device body simply also referred to as base body or body in its completely produced state, which can for example comprise a receiving space also referred to as receiving area. Furthermore, the device for example comprises a door also referred to as flap in its completely produced state, which is connected to the device body in articulated manner via the hinge, that is by means of the hinge. Thereby, the door is retained on the device body pivotably in relation to the device body by means of the hinge. In other words, the door can be pivoted in relation to the device body while the door is retained on the device body via the hinge. For example, the door can be pivoted in relation to the device body between at least one open position and a closed position by means of the hinge. In particular, it is conceivable that the receiving space comprises an opening in particular formed as a passage opening, which for example opens into the receiving space on the one hand and into an environment of the device body on the other hand in itself, that is considered by itself. In the closed position, at least a partial area of the opening and thus of the receiving space is for example closed by the door in particular towards the environment. In particular, it is conceivable that the entire opening and thus the entire receiving space is covered and thus is closed by the door in particular towards the environment in the closed position. In the open position, the door uncovers at least the partial area such that at least one item can for example be moved from the environment into the receiving space or be moved from the receiving space into the environment via the uncovered partial area in the open position. In particular, if the device is formed as a dishwasher, which is also referred to as washer, the receiving space is for example a treatment chamber for washing dishes. Thus, for example in the open position, dishes can be moved from the environment into the receiving space via the uncovered partial area to wash the dishes. After a purging operation, washed, that is purged, dishes can in particular be removed from the receiving space via the uncovered partial area in the open position.

Now, in order to be able to realize a particularly advantageous actuation of the door, that is to for example be able to particularly advantageously, in particular particularly comfortably, manually pivot the door in relation to the device body in particular between the closed position and the open position, the hinge comprises a base element, which is also referred to as support part. For example, the base element is formed as a base plate. For example, the base element can be formed separately from the device body, wherein the base element is for example attached to the device body, in particular such that relative movements between the base element and the device body are omitted. Further, it is conceivable that the base element is a constituent of the device body, in particular of a wall and especially a sidewall of the device body. Furthermore, the hinge comprises a hinge arm, which is connected to the base element pivotably around a first pivot axis in relation to the base element. Thus, the hinge arm can be pivoted around the first pivot axis in relation to the base element, while the hinge arm is retained on the base element, that is connected to the base element. In particular, the base element is at least indirectly, in particular directly, connectable to the device body or to a component of the device body. Further, it is conceivable that the hinge arm is connectable to the door or to a component of the door. In particular, the hinge arm can be formed separately from the door and connectable to the door or to the component of the door, or the hinge arm is a constituent of the door such that the hinge arm is for example connected to the mentioned component of the door in the completely produced state of the device. Furthermore, the hinge comprises a transfer element, which is retained on the base element rotatably around a rotational axis in relation to the base element. This means that the transfer element can be rotated around the rotational axis in relation to the base element, while the transfer element is retained on the base element, that is connected to the base element. In particular, it is conceivable that the rotational axis is spaced from the first pivot axis. For example, the first pivot axis and the rotational axis run parallel to each other. The transfer element can be formed as a disk, which is also referred to as rotary disk or redirection disk. The transfer element is also referred to as redirection element.

In addition, the hinge comprises a spring, which is also referred to as spring element. Preferably, the spring is a mechanical spring such that the spring is preferably formed as a solid body. Especially, the spring can be a coil spring. Furthermore, the hinge comprises an actuation element, which is coupled to the spring. In addition, the actuation element is coupled to the transfer element in articulated manner. The base element comprises a guide, which is also referred to as first guide. If there is talk of the guide above and in the following, thus, the first guide of the base element is to be understood thereby unless otherwise stated. The actuation element is displaceable in guided manner along the first guide of the base element. This means that the actuation element can be displaced in guided manner along the guide and thereby in relation to the base element. If the actuation element is displaced along the first guide of the base element and thus in relation to the base element, thus, the actuation element is guided by means of the first guide of the base element in the meantime, in particular in relation to the base element. In particular, the first guide is or defines for example a first movement path or first guide path, along which the actuation element is movable in guided manner in relation to the base element. Thus, the first guide for example defines a first movement direction in particular corresponding to the first movement path or the first guide path, along which the actuation element is displaceable in guided manner in relation to the base element. Therein, it is preferably provided that the first movement path or the first guide path and thus for example the first movement direction run straight or rectilinearly, that is along a first straight line. Thus, the first guide, that is the first movement path or the first guide path, for example extends rectilinearly and therein along the first straight line. Therein, it is preferably provided that the first guide and thus the first movement path or the first guide path and thus for example the first movement direction run in vertical direction in installation position of the hinge. Therein, the hinge takes its installation position in the completely produced state of the device comprising the hinge if the device is in its use position provided for its intended use. For example, the device is standing on an at least substantially horizontal plane in the use position. Further, it is conceivable that the first guide and thus for example the first movement path or the first guide path and thus the first movement direction, hence in particular the first straight line, run obliquely to the vertical direction and obliquely to the horizontal in installation position of the hinge.

Since the actuation element is coupled to the spring and displaceable in guided manner along the first guide of the base element and thus in relation to the base element, the spring can be loaded and unloaded by displacement of the actuation element effected along the first guide and thus in relation to the base element. In other words, if the actuation element is shifted back and forth along the first guide and in relation to the base element, thus, the spring is, in particular alternatingly, loaded and unloaded hereby. Again expressed in other words, if the actuation element is for example shifted in a first direction along the first guide in relation to the base element, thus, the spring is for example loaded hereby. For example, if the actuation element is thereupon shifted in a second direction opposite to the first direction along the first guide in relation to the base element, thus, the spring is at least partially unloaded hereby. For example, the spring is formed as a tension spring, which, if for example the actuation element is shifted in the first direction along the first guide, is elongated, that is increased in its length and thereby loaded. If the actuation element is thereupon for example shifted in the second direction along the first guide, thus the spring is thereby for example shortened in its length, that is shortened in length and therein at least partially unloaded.

In addition, the hinge comprises a lever element, which is connected to the transfer element pivotably around a second pivot axis in relation to the transfer element. Preferably, it is provided that the second pivot axis is spaced from the first pivot axis and from the rotational axis, wherein it is very preferably provided that the second pivot axis runs parallel to the first pivot axis and parallel to the rotational axis. In addition, the lever element is connected to the hinge arm pivotably around a third pivot axis in relation to the hinge arm. Therein, it is preferably provided that the third pivot axis is spaced from the first pivot axis, from the rotational axis and from the second pivot axis. Preferably, the third pivot axis runs parallel to the first pivot axis, parallel to the second pivot axis and parallel to the rotational axis. Thus, by pivoting the hinge arm effected around the first pivot axis and in relation to the base element, the transfer element is drivable by the hinge arm via the lever element and thereby rotatable around the rotational axis in relation to the base element, whereby the actuation element is drivable by the transfer element and thereby displaceable along the guide in relation to the base element and the spring can be loaded and unloaded. In other words, if the hinge arm is for example pivoted or swiveled around the first pivot axis in a first pivot direction in relation to the base element, thus, the transfer element is hereby driven via the lever element and thereby rotated around the rotational axis in a first rotational direction in relation to the base element. Therein, for example the first pivot direction and the first rotational direction are for example concordant in a movement plane running perpendicularly to the first pivot axis and perpendicularly to the rotational axis. In that the transfer element is rotated around the rotational axis in the first rotational direction in relation to the base element, the actuation element is driven by the transfer element and thereby for example displaced in guided manner in the first direction along the guide in relation to the base element. Thereby, the spring is loaded. If the hinge arm also referred to as pivot arm is thereupon for example pivoted or swiveled around the first pivot axis in a second pivot direction opposite to the first pivot direction in relation to the base element, thus, the transfer element is hereby driven by the hinge arm via the lever element and thereby rotated around the rotational axis in a second rotational direction opposite to the first rotational direction in relation to the base element. For example, the second pivot direction and the second rotational direction are concordant in particular related to the movement plane, that is in the movement plane. In that the transfer element is rotated around the rotational axis in the second rotational direction in relation to the base element, the actuation element is driven by the transfer element and thereby displaced in guided manner along the first guide in the second direction in relation to the base element. Hereby, the spring is for example at least partially unloaded. By loading and unloading the spring, the following is in particular to be understood: For example, the actuation element can be displaced in guided manner along the first guide in relation to the base element between at least one first actuation position and at least one second actuation position. For example, the actuation element can be displaced from the first actuation position into the second actuation position in that the actuation element is displaced or shifted in the first direction along the first guide. Thus, the actuation element can for example be displaced from the second actuation position into the first actuation position, while the actuation element is displaced or shifted in the second direction along the first guide. In the second actuation position, the spring is more severely loaded with respect to the first actuation position, that is compared to the first actuation position, such that conversely considered, the spring is less severely loaded in the first actuation position with respect to the second actuation position. In the first actuation position, the spring can be completely unloaded or the spring is loaded in the first actuation position, but less severely loaded than in the second actuation position. Thus, the spring provides a spring force at least in the second actuation position, which for example acts on the hinge arm via the actuation element, the transfer element and the lever element and for example on the door of the device via the hinge arm. Thus, the hinge arm can for example be pivoted or swiveled around the first pivot axis in the first pivot direction in relation to the base element against the spring force of the spring. For example, the hinge arm can be pivoted around the first pivot axis in relation to the base element between at least one first pivot position and at least one second pivot position. For example, the hinge arm can be pivoted or swiveled from the first pivot position into the second pivot position in that the hinge arm is pivoted or swiveled in the first pivot direction around the first pivot axis in relation to the base element. Thus, the hinge arm can for example be pivoted or swiveled from the second pivot position into the first pivot position in that the hinge arm is pivoted in the second pivot direction around the first pivot axis in relation to the base element. Thus, if the hinge arm is for example in the first pivot position, thus, the actuation element is in the first actuation position. Thus, if the hinge arm is for example in the second pivot position, thus, the actuation element is in the second actuation position. This thus means that the first pivot position of the hinge arm is associated with or coincides with the first actuation position of the actuation element, and the second pivot position of the hinge arm is associated with the second actuation position of the actuation element or coincides with the second actuation position of the actuation element. In particular, it is preferably provided that the first pivot position of the hinge arm corresponds to or coincides with the closed position of the door. In other words, it is preferably provided that the first pivot position of the hinge arm causes the closed position of the door and vice versa. Thus, it is preferably provided that the second pivot position of the hinge arm corresponds to or coincides with the open position of the door such that the second pivot position of the hinge arm preferably causes the open position of the door and vice versa. This in particular means that the door can be opened, that is can be pivoted or swiveled from the closed position into the open position in particular in relation to the device body and the base element in that the hinge arm is pivoted from the first pivot position into the second pivot position. Thus, the door can for example be closed, that is pivoted or swiveled from the open position into the closed position in particular in relation to the device body and in relation to the base element in that the hinge arm is pivoted or swiveled around the first pivot axis from the second pivot position into the first pivot position in relation to the base element. In other words, if the door is for example opened, thus, the hinge arm is hereby pivoted in the first pivot direction around the first pivot axis in relation to the base element and thus pivoted or swiveled from the first pivot position into the second pivot position. If the door is thereupon closed, thus, the hinge arm is hereby pivoted or swiveled in the second pivot direction around the first pivot axis in relation to the base element and thus pivoted or swiveled from the second pivot position into the first pivot position. This means that it is preferably provided that the spring is loaded in opening the door such that the spring force of the spring for example is opposed to opening the door. However, this is particularly advantageous since an excessively fast and/or surprising and/or automatic opening of the door, that is caused by the weight force of the door, can be avoided hereby. Thereby, the door can be particularly advantageously, in particular particularly comfortably, actuated, in particular in manual manner and thus by a person. In particular, it is possible to balance the door for example in at least one intermediate position situated or arranged between the open position and the closed position by means of the spring force, thus keep it in the intermediate position, such that an undesired and/or automatic opening as well as an undesired and/or automatic closing of the door for example starting from the intermediate position can be avoided. Further, it is for example conceivable that for example if the door is moved towards the closed position starting from the intermediate position, the door is pulled shut, hence moved into the closed position, by means of the spring force and in particular without assistance of a person, such that secure closing of the door can be ensured. Alternatively or additionally, it is conceivable that for example if the door is moved towards the open position starting from the intermediate position, the door completely falls open in automatic or autonomous manner, that is due to its weight force and thus in particular without assistance of a person, that means it is completely moved into the open position, namely in particular against the spring force, wherein an excessively fast opening of the door and/or an excessively hard impact of the door in the open position can be avoided by means of the spring force. The lever element is or functions as a connection lever, via which the transfer element is drivable by the hinge arm. Therein, the transfer element can have a radius or diameter in particular relating to the rotational axis, wherein the radius or the diameter can be advantageously largely configured. Hereby, an advantageous transmission in particular between the hinge arm and the spring can for example be realized such that an advantageous actuation of the door can be presented.

In particular, the background of the invention is in that doors of devices can have different weights and thus also very high weights. This is usually due to the fact that the respective door usually comprises a respective base body and a respective front plate for example also referred to as furniture plate, which is attached to the respective base body. Hereby, the device can for example be optically advantageously integrated in an environment such as for example a kitchen environment and therein in particular in furniture such as for example kitchen furniture. In particular, the front plates can have different weights and therein also have very high weights according to material, from which the respective front plate is formed. Now, the hinge according to the invention can be particularly advantageously used for doors with high weights, in particular in that advantageous transmissions between the hinge arm and the spring can be realized by the use of the transfer element and the lever element, via which the transfer element is coupled to the hinge arm. Thereby, the door can for example be secured against excessively fast opening and/or be securely moved, in particular pulled, into the closed position, in particular even if the door has a high weight. In addition, the hinge according to the invention can be particularly simply and thus time- and cost-efficiently adapted to different weights of doors such that the hinge has a particularly wide and thus flexible range of use, which is also referred to as range of employment.

Since the actuation element is coupled to the spring, for example to an end of the spring, and since the actuation element is displaceable along the first guide, a spring guide is provided by the actuation element and the first guide, by means of which the spring can be guided, that means is guided, in particular if the spring is loaded and unloaded.

In order to be able to particularly advantageously, in particular particularly comfortably, actuate the door, that is pivot it between the closed position and the open position, it is provided in an embodiment of the invention that the guide (first guide of the base element) extends in a plane extending perpendicularly to the rotational axis. Thus, the plane for example runs with the previously mentioned movement plane or coincides with the movement plane.

A further embodiment is characterized in that the base element comprises a second guide in particular provided in addition to the first guide. Therein, the transfer element and with it the rotational axis are displaceable in guided manner along the second guide of the base element and thus in relation to the base element. For example, the second guide is or defines a second movement path or a second guide path, along which the transfer element and with it the rotational axis are displaceable in guided manner in relation to the base element. Thus, a second movement direction is for example defined by the second guide, along which the transfer element and the rotational axis are displaceable in guided manner or can be displaced in guided manner in relation to the base element if the transfer element and the rotational axis are displaced along the second guide in relation to the base element. Therein, it is preferably provided that the second movement path or the second guide path and thus for example the second movement direction run rectilinearly, hence along a second straight line. Preferably, it is provided that the second straight line runs parallel to the first straight line. Thus, it is preferably provided that the second movement path or the second guide path runs parallel to the first movement path or to the first guide path. Thus, it is preferably provided that the second movement direction runs parallel to the first movement direction. Preferably, the second movement path or the second guide path and thus for example the second movement direction runs in vertical direction in installation position of the hinge, such that the second guide preferably extends in vertical direction. Again expressed in other words, it is thus for example provided that the second guide, in particular the second movement path or the second guide path, extends along the second movement direction and therein for example along the second straight line, wherein it is preferably provided that the second straight line runs in vertical direction in installation position of the hinge. Alternatively or additionally, the first straight line runs in vertical direction in installation position of the hinge.

In that the transfer element and the rotational axis are displaceable in guided manner along the second guide of the base element, an advantageous coupling of the hinge arm to the spring via the lever element, the transfer element and the actuation element can be realized such that the door can be particularly advantageously actuated. In that the transfer element and the rotational axis are displaceable along the second guide and thus in relation to the base element, an advantageous support of the transfer element, in particular on the base element, can in particular be presented, such that a particularly advantageous actuation of the hinge arm and thus of the door can be realized.

It has proven particularly advantageous if the second guide extends in the plane, in which the first guide also extends. Thereby, an advantageous movability of the actuation element and of the transfer element and as a consequence also of the lever element and of the hinge arm can be realized such that the hinge arm and thus the door can be particularly advantageously actuated, that is pivoted.

In a further, particularly advantageous embodiment of the invention, the hinge comprises at least one brake surface, which in particular at least indirectly and very preferably directly exerts a friction force as a brake force on the transfer element. The brake force is opposed to a rotation of the transfer element effected around the rotational axis and in relation to the base element. In other words, the transfer element, if it is rotated around the rotational axis in relation to the base element, is braked by means of the brake force. Thereby, the door can for example be particularly advantageously balanced, that is in particular kept in the intermediate position. In addition, an excessively fast opening of the door and thus an excessively hard impact of the door in the open position can for example be avoided such that a particularly advantageous actuation of the door can be presented. Thereby, the hinge can for example be additionally used for a plurality of doors with different weights such that a particularly flexible usability and thus a particularly great range of employment of the hinge can be realized. For example, the brake surface is at least indirectly, in particular directly, provided on the base element. Hereby, it is in particular to be understood that the brake surface is for example provided on the base element such that relative movements between the base element and the brake surface are omitted. Thereby, the transfer element and the door via the transfer element can be advantageously braked.

In order to be able to advantageously brake the transfer element in the rotation thereof and the hinge arm and the door via the transfer element, it is provided in further configuration of the invention that the brake surface adjoins to the transfer element along the second guide, in particular in the previously mentioned, second direction. Hereby, it is for example possible to particularly advantageously brake the transfer element and the hinge arm and thus the door via the transfer element and via the lever element if the hinge arm is pivoted from the first pivot position into the second pivot position, in particular if the door is opened. Hereby, it is in particular possible to more severely brake the hinge arm if it is pivoted from the first pivot position into the second pivot position, by means of the brake surface than if the hinge arm (pivot arm) is pivoted from the second pivot position into the first pivot position. Hereby, an excessively fast, automatic opening of the door, thus effected by the weight force of the door, can for example be particularly advantageously avoided such that a particularly advantageous actuation of the door can be presented.

In particular, the invention allows guiding the transfer element by means of the second guide for example formed as a vertical elongated hole, in particular in the second guide, such that the transfer element is pressed against the brake surface for example formed by a brake pad or formed as a brake pad by the spring force in particular acting along the first guide and especially in the second direction and by a second force also referred to as lever force, which is for example exerted by the lever on the transfer element and therein for example acts along the second guide, in particular in the second direction, such that the spring force and the lever force for example act in the same direction, which is for example the second direction. In particular, the invention allows pressing the transfer element against the brake surface in the second direction and/or downwards in vertical direction in installation position of the hinge by the spring force and by the lever force such that the transfer element is advantageously braked in particular upon rotation thereof, which is effected when the hinge arm is pivoted from the first pivot position into the second pivot position. Thereby, the hinge can also be advantageously used for doors with high weights.

Preferably, it is provided that the first direction points upwards in vertical direction in installation position of the hinge, such that the second direction preferably points downwards in vertical direction in installation position of the hinge. Thus, it is for example provided that the previously mentioned plane is a vertical plane, hence runs in vertical direction.

In order to be able to particularly advantageously brake the transfer element and thus to realize a particularly advantageous actuation of the door, it is provided in further configuration of the invention that a contact surface of the rotary element for example formed by an outer circumferential lateral surface of the rotary element, the contact surface of which points away from the rotational axis in a direction running perpendicularly to the rotational axis, is in, in particular direct, contact with the brake surface, whereby the brake force, in particular directly, acts on the contact surface. Therein, it is preferably provided that the direction running perpendicularly to the rotational axis is the second direction or coincides with the second direction.

A further embodiment is characterized in that the brake surface is formed of a first material and the transfer element, in particular the contact surface, is formed of a second material different from the first material. Thereby, the transfer element and the hinge arm via the transfer element and the lever element and thus the door can be particularly effectively and efficiently braked such that a particularly advantageous, in particular a particularly comfortable, actuation of the hinge arm and thus of the door can be presented.

In a further, particularly advantageous embodiment of the invention, it is provided that the brake surface is formed by a brake element formed separately from the base element and retained on the base element, which is for example the previously mentioned brake pad. Thereby, the hinge can be particularly simply and thus time- and cost-efficiently produced as well as particularly time- and cost-efficiently serviced or repaired, since only the brake element and not the entire base element has to be exchanged upon wear of the brake element or the brake surface. Hereby, the brake force can additionally be simply and adequately adjusted such that the transfer element can be particularly advantageously braked.

In further, particularly advantageous embodiment of the invention, it is provided that at least a predominant part, that is at least more than half of the spring, in particular the entire spring, adjoins to the transfer element downwards in vertical direction in installation position of the hinge. Thereby, a particularly advantageous, in particular particularly compact, construction of the hinge can be realized, such that the hinge can be particularly advantageously arranged in and/or at the device body. As a consequence, advantageous dimensions for example of the transfer element and/or of the spring can be realized such that a particularly advantageous transmission between the spring and the hinge arm can for example be realized. As a consequence, a particularly advantageous actuation of the door can be ensured.

A further embodiment is characterized in that at least the predominant part, that is at least more than half of the spring, in particular the entire spring, is arranged in a lower area of the base element in installation position of the hinge or adjoins to the base element downwards in vertical direction in installation position of the hinge. Hereby too, a particularly advantageous, in particular a particularly compact construction of the hinge can be realized and/or the hinge can be particularly advantageously arranged in the device body such that particularly advantageous dimensions of the hinge, in particular of the spring and/or of the transfer element, can be realized. As a consequence, an advantageous transmission between the hinge arm and the spring can be realized such that a particularly advantageous actuation of the door can be presented.

In particular, it can be provided that the spring is arranged in and/or on a foot of the base element for example formed as a support plate in installation position of the hinge. Hereby, a particularly advantageous, in particular a particularly compact, construction of the hinge can be presented. The background is in particular that there is mostly sufficient space in the lower area to arrange at least a part of the hinge, in particular the spring, there, such that advantageous dimensions of the hinge, in particular of the transfer element and/or of the spring, can be presented. As already previously described, an advantageous transmission between the hinge arm and the spring can be presented hereby, such that the hinge arm and thus the door can be particularly advantageously actuated, that is pivoted, in particular in manual manner by a person.

In further, particularly advantageous configuration of the invention, it is provided that the actuation element is coupled to the transfer element in articulated manner, in that the actuation element engages with a guide path of the transfer element also referred to as third guide path, wherein the actuation element is displaceable, in particular in guided manner, along the third guide path of the transfer element in relation to the transfer element. Hereby, a rotation effected around the rotational axis and in relation to the base element, hence a rotational movement, of the transfer element can for example be particularly advantageously converted or redirected to an in particular vertical movement of the actuation element along the first guide such that a particularly advantageous coupling between the transfer element and the actuation element and thus between the hinge arm and the spring can be presented. In particular, by means of the third guide path, that is by constructively configuring the third guide path, in particular a shape of the third guide path, it is possible to adjust a ratio, in which the rotational movement of the transfer element is converted or redirected to the movement of the actuation element effected along the first guide. In other words, it is for example possible to adjust a transmission between the transfer element and the actuation element, that is between the rotational movement of the transfer element and the displacement of the actuation element effected along the first guide by means of the third guide path, that is by constructively configuring or designing the third guide path, in particular the shape of the third guide path. Hereby, a particularly advantageous transmission between the hinge arm and the spring can for example be adjusted such that the hinge can for example be particularly advantageously adapted to different weights of different doors. Thereby, a particularly great or wide range of employment of the hinge can be ensured. In other words, by adjusting the mentioned ratio in particular together with the spring force and the spring constant of the spring, a desired characteristic of the hinge also referred to as hinge characteristic can be adequately adjusted such that the hinge or the characteristic thereof can be adequately adapted to different doors, which in particular differ from each other in their weights.

Therein, it has proven particularly advantageous if the guide path runs arcuately, that is curvilinearly, such that the guide path is preferably formed as a guide curve, which is also referred to as cam. Thereby, the previously mentioned ratio between the rotational movement of the transfer element and the displacement of the actuation element formed as a translational movement along the first guide can be particularly advantageously adjusted such that a particularly advantageous actuation of the door can be realized.

In order to be able to realize a particularly advantageous transmission between the hinge arm and the spring and thus a particularly advantageous actuation of the door, it is provided in further embodiment of the invention that the third guide path extends in a guide path plane running perpendicularly to the rotational axis, which preferably is the previously mentioned plane or runs parallel to the previously mentioned plane.

A second aspect of the invention relates to a device, which is for example formed as a household appliance or piece of furniture. The device comprises a device body and at least one door also referred to as flap, which is connected to the device body in articulated manner by means of at least one hinge according to the first aspect of the invention. Advantages and advantageous configurations of the first aspect of the invention are to be regarded as advantages and advantageous configurations of the second aspect of the invention and vice versa. Thus, the door can for example be pivoted in relation to the device body by means of the hinge, in particular between a closed position and at least one open position.

Further advantages, features and details of the invention are apparent from the following description of a preferred embodiment as well as based on the drawing. The features and feature combinations mentioned above in the description as well as the features and feature combinations mentioned below in the description of figure and/or shown in the figures alone are usable not only in the respectively specified combination, but also in other combinations or alone without departing from the scope of the invention.

Figure 2:
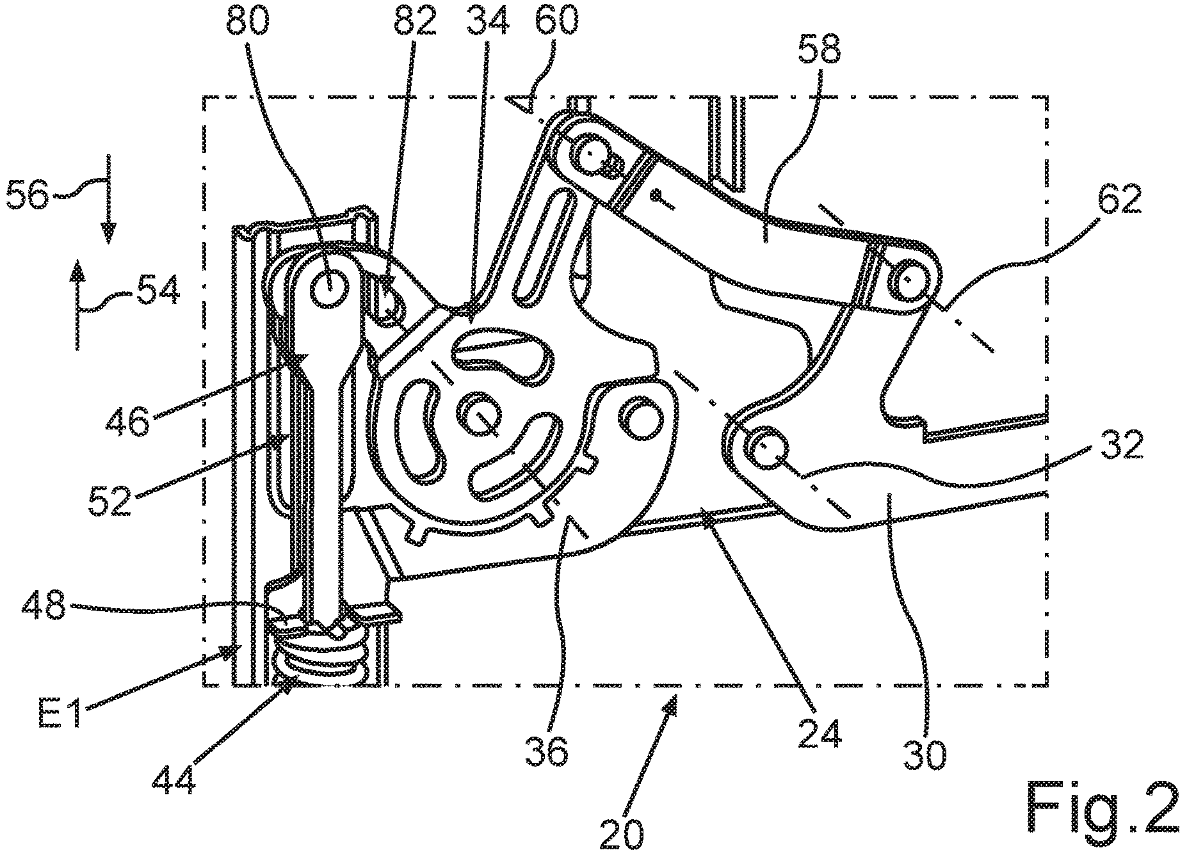
Figure 3A:
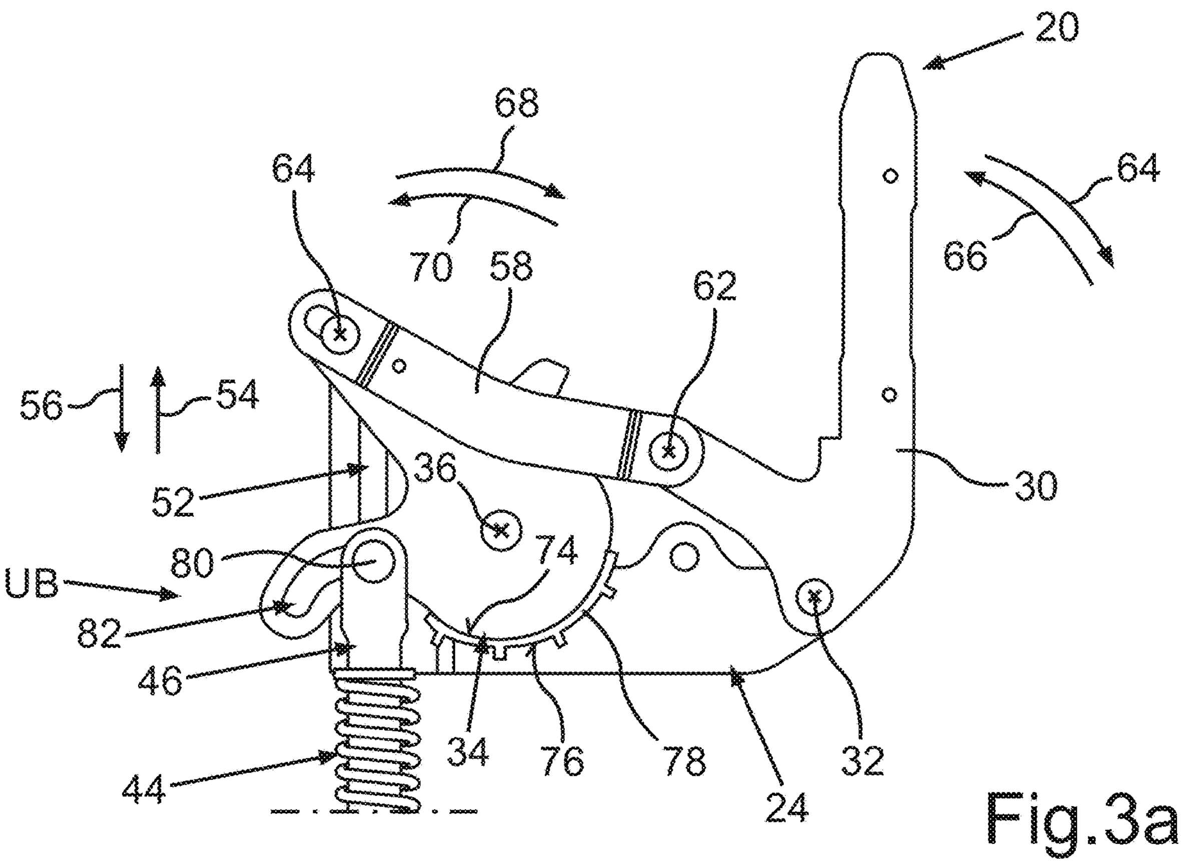
Figure 3B:
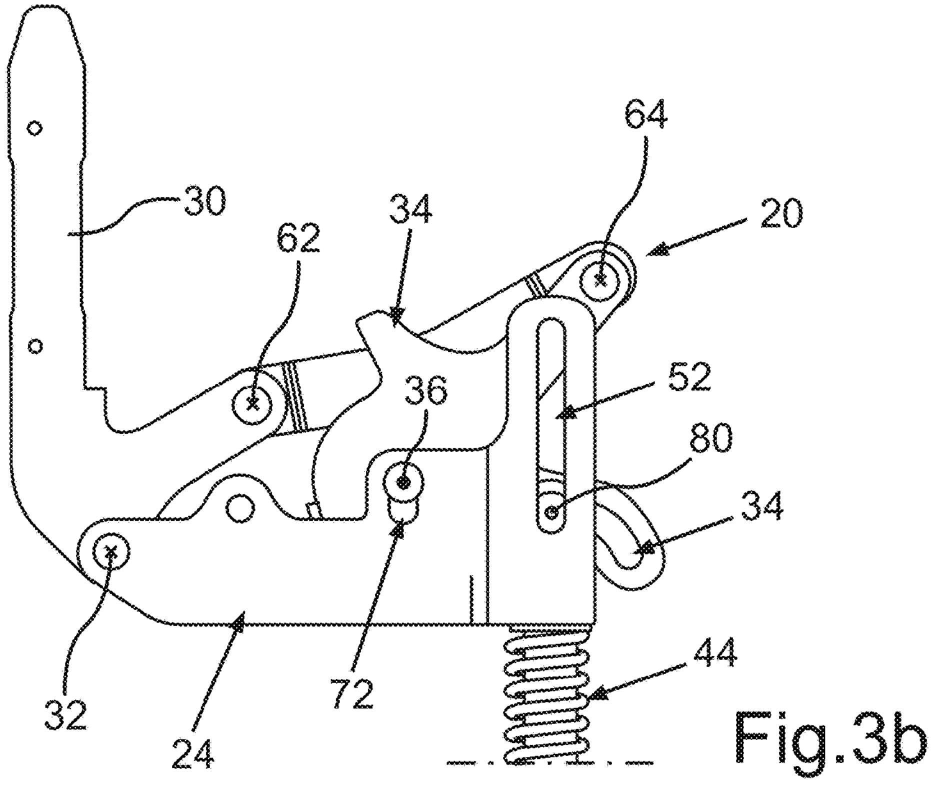

The drawing shows in:

FIG. 1 partially a schematic perspective view of a device with a device body, a door and at least one hinge, by means of which the door is connected to the device body in articulated manner;

FIG. 2 partially a schematic perspective view of the hinge;

FIG. 3*a* a schematic front view of the hinge, wherein a hinge arm of the hinge is in a first pivot position;

FIG. 3*b* a schematic rear view of the hinge according to FIG. 3*a;*

Figure 4A:
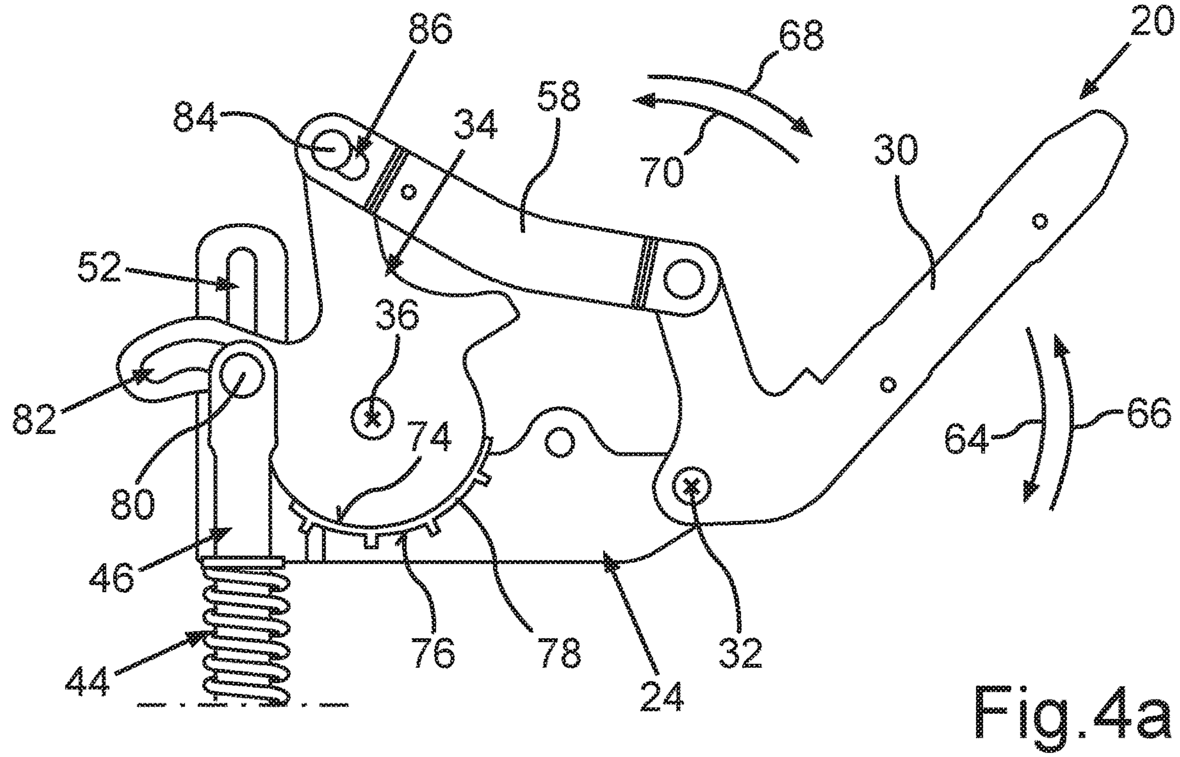
Figure 4B:
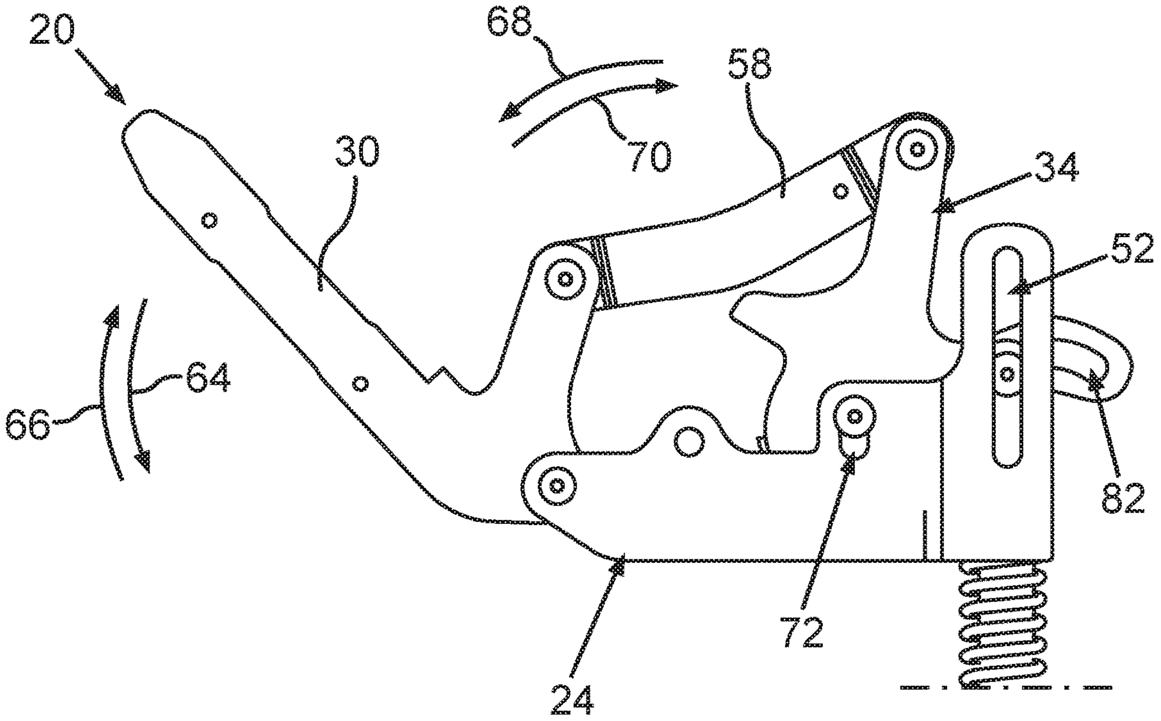

FIG. 4*a* a schematic front view of the hinge, wherein the hinge arm is in an intermediate position;

FIG. 4*b* a schematic rear view of the hinge according to FIG. 4*a;*

Figure 5A:
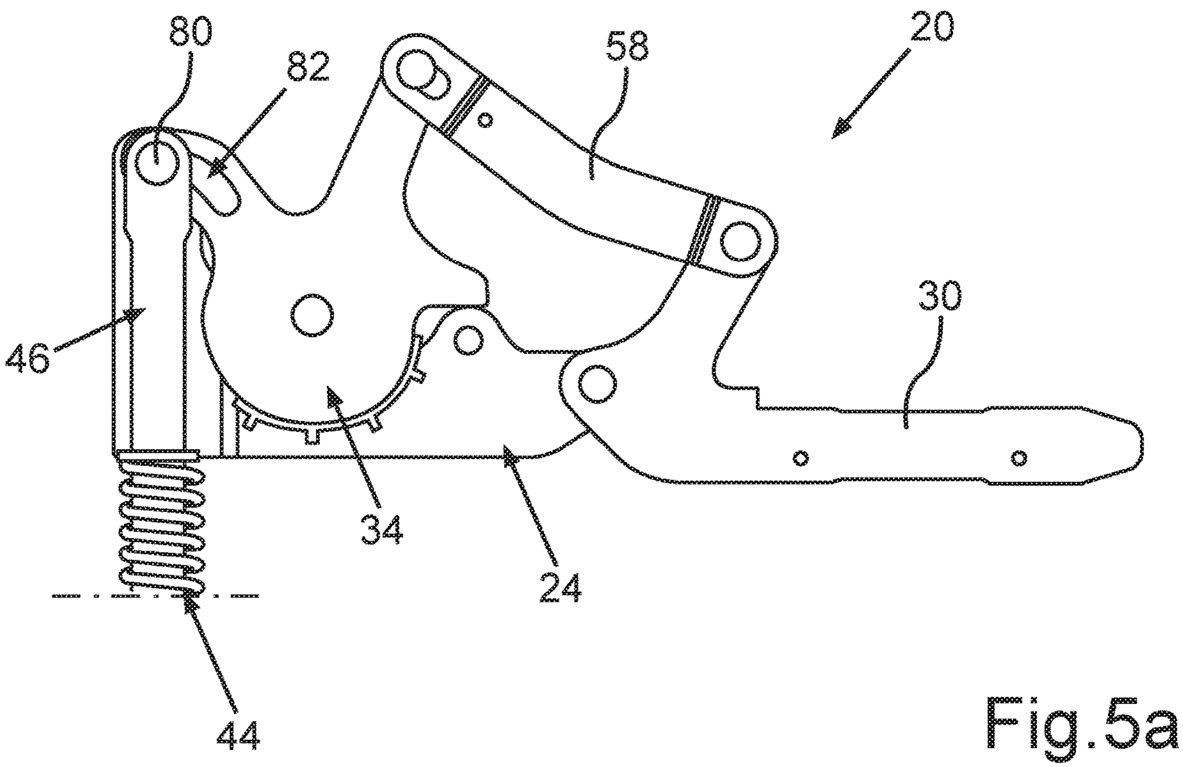
Figure 5B:
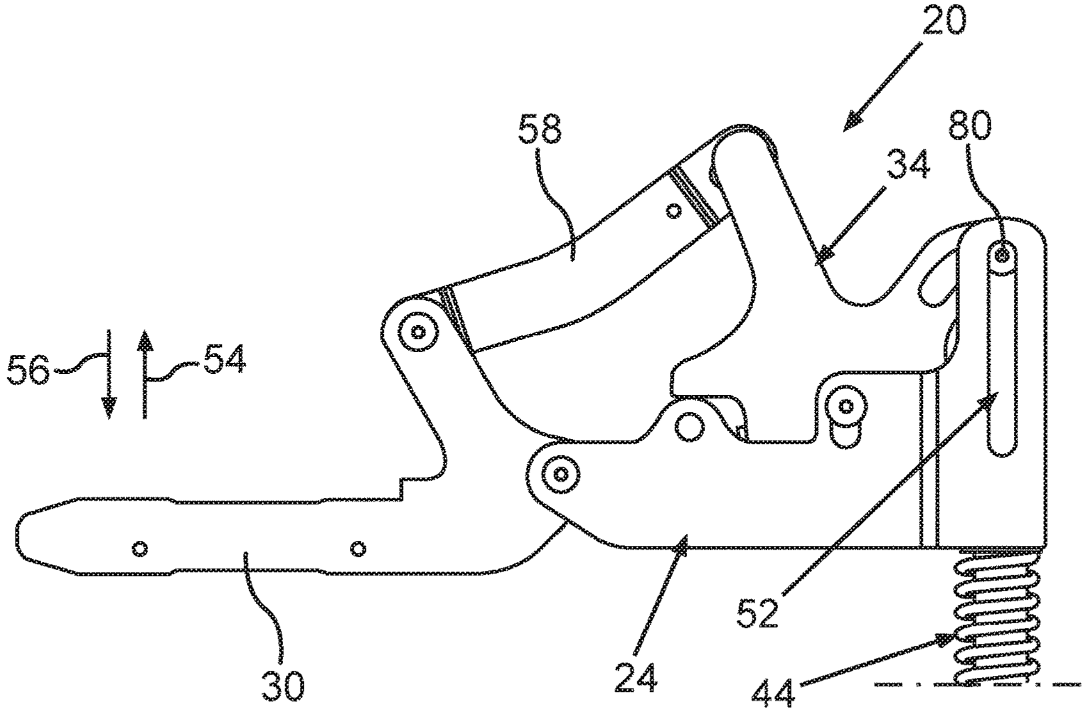
Figure 6:
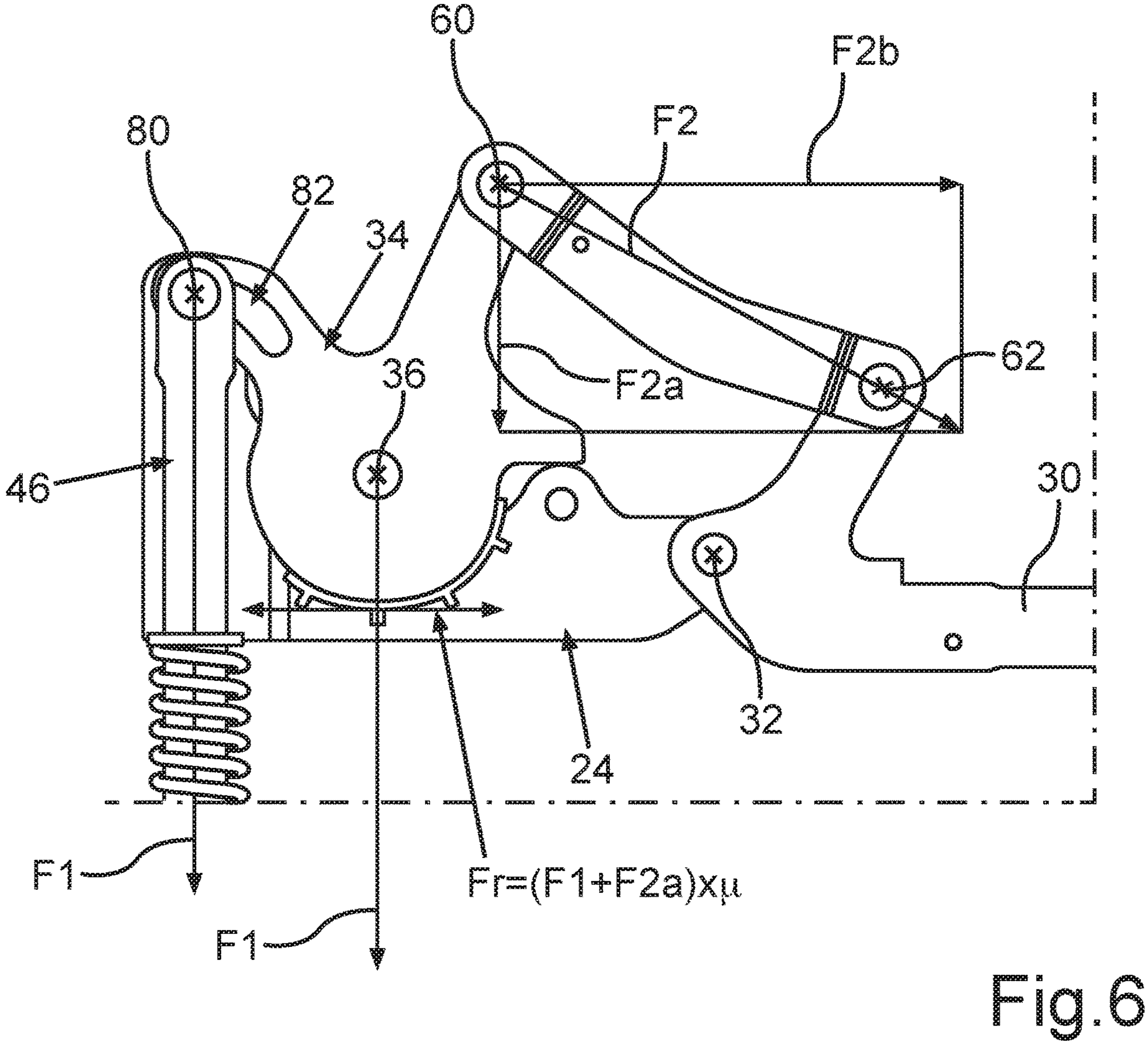

FIG. 5*a* a schematic front view of the hinge, wherein the hinge arm is in a second pivot position;

FIG. 5*b* a schematic rear view of the hinge according to FIG. 5*a*; and FIG. 6 partially a further schematic front view of the hinge.

In the Figs., identical or functionally identical elements are provided with identical reference characters.

FIG. 1 partially shows a device 10 in a schematic perspective view. In the embodiment shown in FIG. 1, the device 10 is formed as a household appliance. In particular, the device 10 is formed as a dishwasher, which is also referred to as washer. The device 10 comprises a device body 12, which is a housing in the embodiment shown in FIG. 1. The housing is also referred to as appliance housing. The housing (device body 12) comprises a receiving space 14 also referred to as receiving area, wherein the receiving space 14 and thus the housing comprises an opening 16. The opening 16 opens into the receiving space 14 on the one hand and into an environment of the housing (device body

12) on the other hand. In the embodiment shown in FIG. 1, the receiving space 14 is a treatment chamber for washing dishes.

Furthermore, the device 10 includes a door 18 also referred to as flap as well as at least one hinge 20. The door 18 is connected to the device body 12 in articulated manner via the hinge 20, that is by means of the hinge 20, such that the door 18 is pivotable between a closed position and at least one open position in relation to the device body 12. In FIG. 1, the door 18 is in an intermediate position, which is between the open position and the closed position. In particular, the open position and the closed position are respective final positions of the door 18, the final positions of which are also referred to as final poses. Therein, the door 18 can be moved into the respective final position, but not be moved beyond the respective final position. In the closed position, the opening 16 and thus the receiving space 14 are, in particular completely, covered and thus closed by the door 18. In the open position, the door 18 uncovers at least a partial area of the opening 16 and thus of the receiving space 14 such that dishes can be moved from the environment into the receiving space 14 or dishes can be moved out of the receiving space 14 to or into the environment in the open position of the door 18. In particular, it is conceivable that the door 18 is connected to the device body 12 in articulated manner by means of at least or exactly one second hinge not apparent in the Figs., wherein the hinges are for example arranged on sides of the device body 12 opposing each other in transverse direction of the device 10. The transverse direction is illustrated by a double arrow 22 in FIG. 1 and runs horizontally in a use position of the device 10 shown in FIG. 1, that is in a horizontal plane. The device 10 takes its use position in its position, that is orientation, provided for its intended use. In particular, the door 18 can be pivoted around a door pivot axis in relation to the device body 12, wherein the door pivot axis runs in transverse direction of the device 10 in the use position of the device 10. The previous and following explanations to the hinge 20 can be readily transferred to the other hinge and vice versa. For example, a person staying in the environment can manually actuate the door 18 and thereby manually pivot it between the closed position and the open position in relation to the device body 12. As is explained in the following, a particularly advantageous actuation of the door 18 can be ensured by means of the hinge 20. Hereto, the hinge 20, as is particularly well apparent from FIG. 2, comprises a base element 24, which is also referred to as support element or support part and is for example formed as a base plate, which is also referred to as support plate. In the embodiment shown in the Figs., the base element 24 is formed separately from the device body 12 and therein at least indirectly, in particular directly, connected to the device body 12. The device body 12 comprises two sidewalls 26 and 28, which are spaced from each other in transverse direction of the device 10 and delimit the receiving space 14 in transverse direction of the device 10. Therein, the base element 24 is for example attached to the sidewall 26, in particular such that relative movements between the sidewall 26 and the base element 24 are prevented. It is apparent that the sidewall 26 is a component of the device body 12.

In addition, the hinge 20 comprises a hinge arm 30 simply also referred to as arm or pivot arm, which is connected to the base element 24 pivotably around a first pivot axis 32 in relation to the base element 24. In installation position of the hinge 20, the pivot axis 32 extends in transverse direction of the device 10, wherein the hinge 20 takes its installation position in completely produced state of the device 10 and if the device 10 is in its use position provided for its intended use, which is shown in FIG. 1. Therein, the device 10 comprises the hinge 20 in its completely produced state, which is attached to the sidewall 26 in the completely produced state of the device 10. In particular, the door pivot axis is defined by the hinge 20. Therein, it is conceivable that the first pivot axis 32 coincides with the door pivot axis or is the door pivot axis.

In addition, the hinge 20 comprises a transfer element 34, which is retained on the base element 24 rotatably around a rotational axis 36 in relation to the base element 24. In the embodiment shown in the Figs., the pivot axis 32 and the rotational axis 36 run parallel to each other, wherein the pivot axis 32 and the rotational axis 36 are spaced from each other, in particular in depth direction of the device 10. The depth direction of the device is illustrated by a double arrow 38 and runs perpendicularly to the transverse direction. In the use position of the device 10, the depth direction runs horizontally, hence in the previously mentioned, horizontal plane, such that the transverse direction and the depth direction extend in the common, horizontal plane in the use position of the device 10. Along the depth direction of the device 10, the receiving space 14 is delimited rearwards by a rear wall 40 of the device body 12. In the closed position of the door 18, the receiving space 14 is delimited frontwards by the door 18 in the depth direction of the device 10. In height direction of the device 10, the receiving space 14 is downwards delimited by a bottom of the device body 12 not apparent in the Figs. In height direction of the device upwards, the receiving space 14 is delimited by a ceiling of the device body 12 not apparent in the Figs. The height direction of the device 10 is illustrated by a double arrow 42 and runs perpendicularly to the depth direction and perpendicularly to the transverse direction, wherein the height direction runs in vertical direction, hence runs vertically, in the use position of the device 10.

Furthermore, the hinge 20 comprises a spring 44 partially apparent in FIG. 2. Presently, the spring 44 is a mechanical spring, hence formed as a solid body. The spring 44 can be formed as a tension spring or else as a compression spring, wherein the spring 44 is for example presently formed as a compression spring. The hinge 20 additionally comprises an actuation element 46, which is coupled to the spring 44. The spring 44 comprises two ends E1 and E2, which are spaced from each other in longitudinal extension direction of the spring 44. In installation position of the hinge 20, the longitudinal extension direction of the spring 44 runs in vertical direction. For example, the end E1 is at least indirectly, in particular directly, supportable or supported on a first stop 48 provided on the base element 24 in longitudinal extension direction of the spring 44, wherein the stop 48 is at least indirectly, in particular directly, provided on the base element 24, in particular such that relative movements between the base element 24 and the stop 48 are omitted. The second end E2 is for example at least indirectly, in particular directly, supportable or supported on the actuation element 46, in particular on a second stop 50 of the actuation element 46, in longitudinal extension direction of the spring 44. For example, the ends E1 and E2 and thus the spring 44 are arranged between the stops 48 and 50 in longitudinal extension direction of the spring 44. As will be explained in the following, the stop 50 is in particular translationally movable, hence displaceable, in longitudinal extension direction of the spring 44 in relation to the stop 48, whereby the spring 44 can be loaded and unloaded.

For example, if the stop 50 is moved towards the stop 48, thus, the end E2 is moved towards the end E1. Hereby, the spring 44 is compressed and thus loaded. If the stop 50 is, in particular thereupon, moved away from the stop 48, thus, the spring 44 can at least partially relax. In other words, the end E2 can move away from the end E1 such that the spring 44 can increase in its length and thus at least partially relax. By loading the spring 44, the spring 44 provides a spring force, which at least indirectly, in particular directly, acts on the actuation element 46, in particular via the stop 50 of the actuation element 46, in particular in longitudinal extension direction of the spring 44 and thus presently for example in vertical direction.

It is particularly well apparent in synopsis with FIG. 3*b*, that the base element 24 comprises a first guide 52. The base element 24 can be single-piece or integrally formed, hence from a single piece. Further, it is conceivable that the base element 24 is multi-part formed and thus comprises multiple components formed separately from each other and thus connected to each other. The actuation element 46 is coupled to the transfer element 34 in articulated manner and displaceable in guided manner along the first guide 52 of the base element 24, hence translationally movable in guided manner. This means that the actuation element 46 can be displaced in guided manner along the guide 52 of the base element 24 and thus in relation to the base element 24. The first guide 52 is or includes a first movement path, which is also referred to as first guide path. Therein, the actuation element 46 for example engages with the first movement path such that the actuation element 46 can be displaced in guided manner along the first movement path and thus in relation to the base element 24. The first movement path is or defines a first movement direction, along which the actuation element 46 can be displaced in guided manner in relation to the base element 24. In the embodiment shown in the Figs., the first guide 52 and thus the first movement path rectilinearly run in the first movement direction along a first straight line, which presently runs in vertical direction, hence runs vertically, in installation position of the hinge 20. Thus, the first guide 52 vertically extends such that the first guide 52 is a vertical guide, in particular a vertical sliding guide. By displacing the actuation element 46 effected along the first guide 52 and thus along the first movement path and along the first movement direction, the displacement of which is effected in vertical direction, in particular related to the installation position of the hinge 20, in that the first guide 52 vertically runs, the spring can be loaded and unloaded.

In FIG. 2, a first direction is illustrated by an arrow 54, which coincides with the first movement direction or runs parallel to the first movement direction. In addition, a second direction is illustrated by an arrow 56, which is opposite to the first direction and coincides with the first movement direction or extends parallel to the first movement direction.

In FIGS. 3*a* and 3*b*, the actuation element 46 is for example in a first actuation position. In FIG. 2, the actuation element 46 is for example in a second actuation position. The actuation element 46 can be moved from the first actuator position into the second actuation position in that the actuation element 46 is shifted or displaced along the first guide 52 in the first direction in relation to the base element 24. Hereby, the stop 50 is for example moved towards the stop 48, whereby the spring 44 is loaded, presently compressed and loaded. If the actuation element 46 is thereupon for example shifted or displaced along the first guide 52 in the second direction opposite to the first direction in relation to the base element 24, thus, the actuation element 46 is displaced or shifted from the second actuation position into the first actuation position hereby, that is for example shifted back. Hereby, the stop 50 is for example moved away from the stop 48, whereby the spring 44 can at least partially relax. It is apparent that the spring force of the spring 44 is opposed to the displacement of the actuation element 46 from the first actuation position into the second actuation position. For example, the spring force of the spring 44 can effect or at least support the displacement of the actuation element 46 from the second actuation position into the first actuation position.

In addition, the hinge 20 comprises a lever element 58, which is connected to the transfer element 34 pivotably around a second pivot axis 60 in relation to the transfer element 34. In addition, the lever element 58 is connected to the hinge arm 30 pivotably around a third pivot axis 62 in relation to the hinge arm 30. It is apparent that the pivot axes 60 and 62 run parallel to each other and are spaced from each other, wherein the pivot axes 60 and 62 run in transverse direction of the device 10, in particular in installation position of the hinge 20. Thus, it is provided in the embodiment shown in the Figs., that the pivot axes 32, 60 and 62 and the rotational axis 36 run parallel to each other and are spaced from each other, in particular considered in pairs. In addition, the pivot axes 32, 60 and 62 and the rotational axis 36 run in transverse direction of the device 10 in installation position of the hinge 20. It is apparent that the lever element 58 is connected both to the hinge arm 30 (pivot arm) in articulated manner and to the transfer element 34 in articulated manner. Hereby, by pivoting or swiveling the hinge arm 30 effected around the first pivot axis 32 and in relation to the base element 24, the transfer element 34 is drivable by the hinge arm 30 via the lever element 58 and thereby rotatable around the rotational axis 36 in relation to the base element 24, whereby the actuation element 46 is drivable by the transfer element 34 and thereby displaceable along the first guide 52 in relation to the base element 24 and the spring 44 can be loaded and unloaded. The hinge arm 30 is pivotable between a first pivot position shown in FIGS. 3*a* and 3*b* and a second pivot position shown in FIGS. 5*a* and 5*b* around the first pivot axis 32 in relation to the base element 24. In particular, the pivot positions of the hinge arm 30 are respective final positions of the hinge arm 30, which can be pivoted into the respective final position, but not pivoted beyond the respective final position. FIGS. 4*a, b* show an intermediate position of the hinge arm 30 also referred to as intermediate pose, wherein the intermediate position is between the first pivot position and the second pivot position.

For example, a first pivot direction is illustrated by an arrow 64 in FIG. 3*a*. In addition, a second pivot direction opposite to the first pivot direction is illustrated by an arrow 66 in FIG. 3*a*. In FIG. 3*a*, a first rotational direction of the transfer element 34 is illustrated by an arrow 68, and a second rotational direction of the transfer element 34 opposite to the first rotational direction is illustrated by an arrow 70. In the embodiment shown in the Figs., the first pivot position of the hinge arm 30 corresponds to the closed position of the door 18, and the second pivot position of the hinge arm 30 corresponds to the open position of the door 18. In addition, the intermediate position of the hinge arm 30 corresponds to the intermediate position of the door 18 shown in FIG. 1. Thus, if the door 18 is in the closed position, thus, the hinge arm 30, which is also referred to as pivot arm, is in the first pivot position. If the door 18 is opened, thus, the hinge arm 30 is hereby pivoted in the first pivot direction around the pivot axis 32 in relation to the base element 24, in particular such that the door 18 is pivoted from the closed position into the open position and thus the hinge arm 30 is pivoted from the first pivot position into the second pivot position. For example, if the door 18 is thereupon closed, that is pivoted from the open position into the closed position, thus, the hinge arm 30 is hereby pivoted or swiveled in the second pivot direction around the pivot axis 32 in relation to the base element 24 and therein from the second pivot position into the first pivot position. If the hinge arm 30 is pivoted in the first pivot direction, thus, the transfer element 34 is driven via the lever element 58 such that the transfer element 34 is rotated in the first rotational direction around the rotational axis 36 in relation to the base element 24. Hereby, the actuation element 46 is displaced along the first guide 52 such that the actuation element 46 is displaced in the first direction along the first guide 52 and therein displaced from the first actuation position into the second actuation position. Hereby, the spring 44 is loaded. If the transfer element 34 is rotated in the second rotational direction around the rotational axis 36 in relation to the base element 24, in particular in that the hinge arm 30 is pivoted in the second pivot direction, thus, the actuation element 46 is hereby displaced in the second direction along the first guide 52 in relation to the base element 24 and thereby displaced from the second actuation position into the first actuation position, whereby the spring 44 is unloaded.

It is particularly well apparent from FIGS. 3*a, b* that the first guide 52 extends in a plane, which runs perpendicularly to the rotational axis 36.

It is particularly well apparent from FIGS. 3*b*, 4*b* and 5*b* that the base element 24 comprises a second guide 72, which is for example formed as an elongated hole. The second guide 72 is or includes a second movement path, which is also referred to as second guide path. The second guide 72 defines or forms a second movement direction, along which the transfer element 34 and with it the rotational axis 36 are displaceable in guided manner in relation to the base element 24. This means that the transfer element 34 and with it the rotational axis 36 are displaceable in guided manner along the second guide 72 and thus along the second movement path and in relation to the base element 24. In the embodiment shown in the Figs., the second guide 72 and thus the second movement path and thus the second movement direction extend rectilinearly and thus along a second straight line, wherein the second straight line presently runs parallel to the first straight line. Thus, the second straight line and thus the second guide 72 and the second movement path run vertically in installation position of the hinge 20, that is in vertical direction. Therein, the guides 52 and 72 are spaced from each other and in particular separated from each other. Therein, the guides 52 and 72 extend in the same, previously mentioned plane.

It is particularly well apparent from FIGS. 3*a*, 4*a* and 5*a* that the hinge 20 comprises a brake surface 74, which, in particular directly, exerts a friction force as a brake force on the transfer element 34. The brake force is opposed to a rotation of the transfer element 34 effected around the rotational axis 36 and for example in the first rotational direction (arrow 68) and in relation to the base element 24. In other words, the transfer element 34 is braked by means of the brake force, that is by means of the brake surface 74, if the transfer element 34 is rotated around the rotational axis 36 in relation to the base element 24 in the first rotational direction and/or in the second rotational direction. Hereby, an excessively fast opening of the door 18 and an excessively hard impact of the door 18 in the open position can for example be avoided. In particular, the brake surface 74 is provided on the base element 24 such that relative movements between the brake surface 74 and the base element 24 are omitted. Therein, the brake surface 74 adjoins to the transfer element 34 along the second guide 72 and therein in particular in the second direction. In installation position of the hinge 20, the second direction (arrow 56) runs downwards in vertical direction and the first direction runs upwards (arrow 54) in vertical direction in installation position of the hinge 20.

The transfer element 34 comprises a contact surface 76, which is in, in particular direct, contact with the brake surface 74, whereby the brake force acts on the contact surface 76. Therein, the contact surface 76 points away from the rotational axis 36 in a direction running perpendicularly to the rotational axis 36, in particular in the second direction, and is for example formed by an outer circumferential lateral surface of the transfer element 34.

Preferably, it is provided that the brake surface 74 is formed of a first material and the transfer element 34 is formed of a second material different from the first material, whereby the transfer element 34 can be particularly advantageously braked.

In the embodiment shown in the Figs., it is provided that the brake surface 74 is formed by a brake element 78 formed separately from the base element 24, which is for example formed as a brake pad or also referred to as brake pad. Therein, the brake element 78 is attached to the base element 24, in particular such that relative movements between the brake element 78 and the base element 24 are omitted.

From a synopsis of FIG. 1 to FIG. 5*b*, it is apparent that at least a predominant part of the spring 44 is arranged in a lower area UB of the base element 24 in installation position of the hinge 20 or that at least the predominant part of the spring 44 adjoins to the base element 24 downwards in vertical direction in installation position of the hinge 20. In particular, it is conceivable that the spring 44 is arranged in and/or at a foot of the base element 24 for example formed as a support plate. Thereby, a particularly advantageous, in particular particularly compact, construction of the hinge 20 can be realized such that the hinge 20 can be particularly advantageously arranged in the device body 12.

For example, the actuation element 46 is coupled to the first guide 52 and thus displaceable in guided manner along the guide 52 such that a coupling element 80 (FIG. 3*b*) of the actuation element 46 engages with the guide 52, in particular with the first movement path thereof. In the embodiment shown in the Figs., the actuation element 46 is coupled to the transfer element 34 in articulated manner such that the actuation element 46, in particular the coupling element 80, (also) engages with a third guide path 82 of the transfer element 34 also referred to as third movement path. Therein, the coupling element 80 and thus the actuation element 46 are displaceable along the third guide path 82 in relation to the transfer element 34. In other words, if the transfer element 34 is rotated around the rotational axis 36 in relation to the base element 24, in particular then and/or in that the hinge arm 30 is pivoted around the pivot axis 32 in relation to the base element 24, thus, the actuation element 46 is displaced in the guide path 82, and the actuation element 46 is driven by the transfer element 34, in particular by at least one wall of the transfer element 34, in particular directly, delimiting the guide path 82, such that the actuation element 46 is displaced in and along the first guide 52. The guide path 82 is also referred to as cam and is arcuately, that is curvilinearly, formed in the embodiment shown in the Figs. Hereby, a respective rotational movement of the transfer element 34 effected around the rotational axis 36 and in relation to the base element 24 can be converted, that is redirected, to a translational movement effected along the first guide 52 and in relation to the base element 24, hence displacement of the actuation element 46. In particular, by configuring, that is constructively designing the cam, an advantageous transmission between the hinge arm 30 and the spring 44 can be adjusted or configured, whereby an advantageous torque in particular opposed to opening the door 18 and also referred to as hinge torque can for example be adjusted or configured.

For example, it is apparent from FIGS. 3*a*, 4*a* and 5*a* that the transfer element 34 is for example coupled to the lever element 58 in articulated manner such that the transfer element 34, in particular a coupling element 84 of the transfer element 34, engages with a fourth guide 86 of the lever element 58, wherein the coupling element 84 and thus the transfer element 34 are displaceable in guided manner along the guide 86 in relation to the lever element 58. In particular, the guide 86 can be formed as an elongated hole.

The previously mentioned spring force of the spring 44 is illustrated by a force arrow F1 in FIG. 6. A second force also referred to as lever force is illustrated by a force arrow F2 in FIG. 6. The second force for example results from the fact that it is pulled on the door 18 and on the hinge arm 30 via the door 18, in particular to open the door 18. Alternatively or additionally, the second force can result from the weight force of the door 18, in particular in the intermediate position and/or in the open position of the door 18. Components of the second force also referred to as force components are illustrated by force arrows F2*a* and F2*b*, wherein the force component of the second force illustrated by the force arrow F2*a* acts in vertical direction and therein downwards, hence is a vertical force component. The force component of the second force illustrated by the force arrow F2*b* acts in horizontal direction and is thus a horizontal force component of the second force. By a force arrow F3, a third force also referred to as sum force is illustrated, which presently acts in vertical direction downwards on the transfer element 34. The sum force results from the spring force (force arrow F1) and from the vertical force component (force arrow F2*a*), wherein the sum force is in particular the sum of the spring force (force arrow F1) and the vertical force component (force arrow F2*a*). The spring force and the vertical force component of the second force act in vertical direction downwards. By means of the third force (force arrow F3) acting downwards in vertical direction, the transfer element 34, in particular the contact surface 76 thereof, is pressed, that is squeezed, against the brake surface 74, whereby the brake force acts on the transfer element 34. The brake force is illustrated by a force arrow Fr in FIG. 6 and results from the third force multiplied by the friction value of the brake surface 74. Thereby, the transfer element 34 and thus the door 18 can be advantageously braked.

The invention claimed is:

1. A hinge for a device, comprising:

a base element;

a hinge arm, which is connected to the base element pivotably around a first pivot axis in relation to the base element;

a transfer element, which is retained on the base element rotatably around a rotational axis in relation to the base element;

a spring;

an actuation element coupled to the spring, which actuation element is coupled to the transfer element in articulated manner and displaceable in guided manner along a guide of the base element, such that by displacement of the actuation element effected along the guide, the spring is configured to be loaded and unloaded; and a lever element, which is connected to the transfer element pivotably around a second pivot axis in relation to the transfer element and to the hinge arm pivotably around a third pivot axis in relation to the hinge arm, such that by pivoting the hinge arm effected around the first pivot axis and in relation to the base element, the transfer element is drivable by the hinge arm via the lever element and thereby rotatable around the rotational axis in relation to the base element, whereby the actuation element is drivable by the transfer element and thereby displaceable along the guide in relation to the base element;

wherein the base element comprises a second guide, wherein the transfer element and the rotational axis are displaceable in guided manner along the second guide of the base element.

2. The hinge according to claim 1, wherein the guide extends in a plane extending perpendicularly to the rotational axis.

3. The hinge according to claim 1, wherein the second guide extends in a plane extending perpendicularly to the rotational axis.

4. The hinge according to claim 1, further comprising a brake surface, which exerts a friction force as a brake force on the transfer element, which is opposed to a rotation of the transfer element effected around the rotational axis and in relation to the base element.

5. The hinge according to claim 4, wherein the brake surface adjoins to the transfer element along the second guide.

6. The hinge according to claim 4, further comprising a contact surface of the transfer element, the contact surface pointing away from the rotational axis in a direction running perpendicularly to the rotational axis, the contact surface further being in contact with the brake surface, whereby the brake force acts on the contact surface.

7. The hinge according to claim 4, wherein the brake surface is formed of a first material and the transfer element is formed of a second material different from the first material.

8. The hinge according to claim 4, wherein the brake surface is formed by a brake element formed separately from the base element and retained on the base element.

9. The hinge according to claim 1, wherein at least a predominant part of the spring adjoins to the transfer element downwards in vertical direction in installation position of the hinge.

10. The hinge according to claim 1, wherein at least a predominant part of the spring is arranged in a lower area (B) of the base element in installation position of the hinge or adjoins to the base element downwards in vertical direction in installation position of the hinge.

11. The hinge according to claim 1, wherein the actuation element is coupled to the transfer element in articulated manner in that the actuation element engages with a guide path of the transfer element, wherein the actuation element is displaceable along the guide path in relation to the transfer element.

12. The hinge according to claim 11, wherein the guide path runs arcuately.

13. The hinge according to claim 11, wherein the guide path extends in a guide path plane running perpendicularly to the rotational axis.

14. A household appliance with a device body, and with at least one door connected to the device body in an articulated manner by means of at least one hinge according to claim 1.

15. A piece of furniture with a device body, and with at least one door connected to the device body in an articulated manner by means of at least one hinge according to claim 1.

* * * * *